United States Patent [19]
Neth

[11] Patent Number: 5,386,416
[45] Date of Patent: Jan. 31, 1995

[54] REPEATER HAVING A BYPASS CIRCUIT FOR PASSING TIME DIVISION MULTIPLEX SIGNALS ALONG EVEN THOUGH SOME TIME SLOTS ARE NOT REINJECTED

[75] Inventor: Alois Neth, Ludwigsburg, Germany

[73] Assignee: Alcatel N.V., Amsterdam, Netherlands

[21] Appl. No.: 538,108

[22] Filed: Jun. 14, 1990

[30] Foreign Application Priority Data

Jun. 16, 1989 [DE] Germany .......................... 3919680

[51] Int. Cl.⁶ .......................... H04B 3/42; H04B 3/46
[52] U.S. Cl. .................................. 370/13.1; 370/16; 370/55; 371/11.2
[58] Field of Search ................... 370/16, 55, 97, 13, 370/13.1; 371/11.1, 11.2, 20.2

[56] References Cited

U.S. PATENT DOCUMENTS

| | | | |
|---|---|---|---|
| 3,991,278 | 11/1976 | Fang | 370/16 |
| 4,002,847 | 1/1977 | Dail | 370/16 |
| 4,009,469 | 2/1977 | Boudreau | 370/16 |
| 4,090,035 | 5/1978 | Popkin . | |
| 4,190,829 | 2/1980 | Woodward | 370/16 |
| 4,228,535 | 10/1980 | Workman et al. | 370/16 |
| 4,393,491 | 7/1983 | Ashlock et al. | 370/13 |
| 4,393,492 | 7/1983 | Bishop | 370/15 |
| 4,468,767 | 8/1984 | Warren et al. | 370/55 |
| 4,623,884 | 11/1986 | Ihara | 370/16 |
| 4,625,082 | 11/1986 | Kelly | 370/16 |
| 4,633,246 | 12/1986 | Jones et al. | 370/16 |
| 4,700,348 | 10/1987 | Ise | 370/16 |
| 4,759,009 | 7/1988 | Casady et al. | 370/15 X |
| 4,792,948 | 12/1988 | Hangen et al. | 370/68 |
| 4,914,625 | 4/1990 | Billian | 370/16 |

OTHER PUBLICATIONS

IEEE Global Telecommunications Conference, vol. 2 of 3, Houston, Tex.; Dec. 1–4, 1986.
"Multiplexen- und Abzweigen von Fernsprech- und Datensignalen", M. Krohn and H. Muller, *Telecom Report 10* (1987) *Special Multiplex- und Leitungseinrichtungen* (Multiplexing and line transmission equipment), pp. 43–50.

*Primary Examiner*—Melvin Marcelo
*Attorney, Agent, or Firm*—Ware, Fressola, Van Der Sluys & Adolphson

[57] ABSTRACT

When transmitting digital signals using time-division multiplexing via a transmission link with repeaters at which time slots are either only branched or also re-injected, the problem arises of continuing to maintain the transmission of information even when an alarm is triggered in a repeater. The present invention provides a bypass circuit via which the repeater is bypassed when an alarm is triggered therein. If a re-injection of time slots is provided, the bypass circuit can thereby transmit a message to the adjacent repeaters and/or line terminal equipment in order to permit the injection of time slots not re-injected in the repeater. If the time-division multiplex signal contains a service channel, messages can be transmitted via this channel to the adjacent repeaters and follow-up measures can be initiated.

5 Claims, 3 Drawing Sheets

REPEATER HAVING A BYPASS CIRCUIT FOR PASSING TIME DIVISION MULTIPLEX SIGNALS ALONG EVEN THOUGH SOME TIME SLOTS ARE NOT REINJECTED

BACKGROUND OF THE INVENTION

1. Field of the Invention

The present invention relates to a repeater in a transmission link for transmitting digital signals using time-division multiplexing, including a circuit for branching time slots from the incoming time-division multiplex signal.

2. Description of the Prior Art

A transmission link serves, for example, to transmit digital telephone and data signals having a bit sequence rate of 64 kbit/s. When combined into a time-division multiplex signal with 32 time slots, they are transmitted at a bit sequence rate of 2048 kbit/s. The transmission link includes repeaters at which individual time slots are branched. Repeaters are also provided in which the branched time slots or a portion of the branched time slots are re-injected.

Such a repeater, referred to as a branch device, is known from "telcom report", 10 (1987) Special "Multiplex- und Leitungseinrichtungen" (Multiplexing and line transmission equipment), pages 43–50.

This repeater gives an alarm when errors or disturbances occur in the time-division multiplex signal to be transmitted, for instance if a specific bit error ratio is exceeded. If this error is detected in the repeater or if an incoming digital signal fails to appear, an alarm signal is transmitted in the transmission direction. The transmission of information is, however, interrupted if an alarm is triggered by a repeater itself.

SUMMARY OF THE INVENTION

It is an object of the invention to maintain the transmission of information when an alarm is triggered in a repeater.

In a repeater of the kind described, this object is achieved by providing the repeater with a repeating circuit and a bypass circuit via which the digital signals are passed on if an alarm is triggered in the repeating circuit.

The bypass circuit includes a control circuit connected to the repeating circuit for receiving the alarm therefrom. A bypass line has first and second ends, the first end is connected to the repeating circuit input. A switch is controlled by the control circuit and is connected to the repeating circuit output and the second end of the bypass line for selectively connecting either the repeating circuit or the bypass line to the transmission link. The control circuit places the switch in a position that the time-division multiplex signal is transmitted via the bypass. An erasing device is controlled by the control circuit and is disposed in the bypass line for erasing the data contents of the time slots to be branched when an alarm is triggered.

The invention also contemplates a re-injection circuit in which the time slots to be branched are re-injected, and wherein the bypass circuit includes a circuit for transmitting a message, so that if an alarm is triggered in the repeating circuit, the control circuit causes the circuit to transmit in a time slot that is not re-injected a message in the transmission direction to one or a plurality of adjacent repeaters, on the basis of which the time slots not re-injected in the repeating circuit can be re-injected in the adjacent repeater or adjacent repeaters.

The control circuit may also cause the circuit to transmit a message in a service channel of the time-division multiplex signal to one or a plurality of adjacent repeaters and/or to the line terminal equipment.

The invention further contemplates that the repeater may transmit at fixed time intervals a message characteristic of the repeater and that if this message fails to appear in one or a plurality of adjacent repeaters, follow-up measures are initiated.

The repeating circuit may be preceded by an input circuit which, if an alarm is triggered in the repeating circuit, causes the time-division multiplex signal to be fed to the repeating circuit via a high-value resistor.

DETAILED DESCRIPTION OF THE PREFERRED EMBODIMENT

Figure 1:
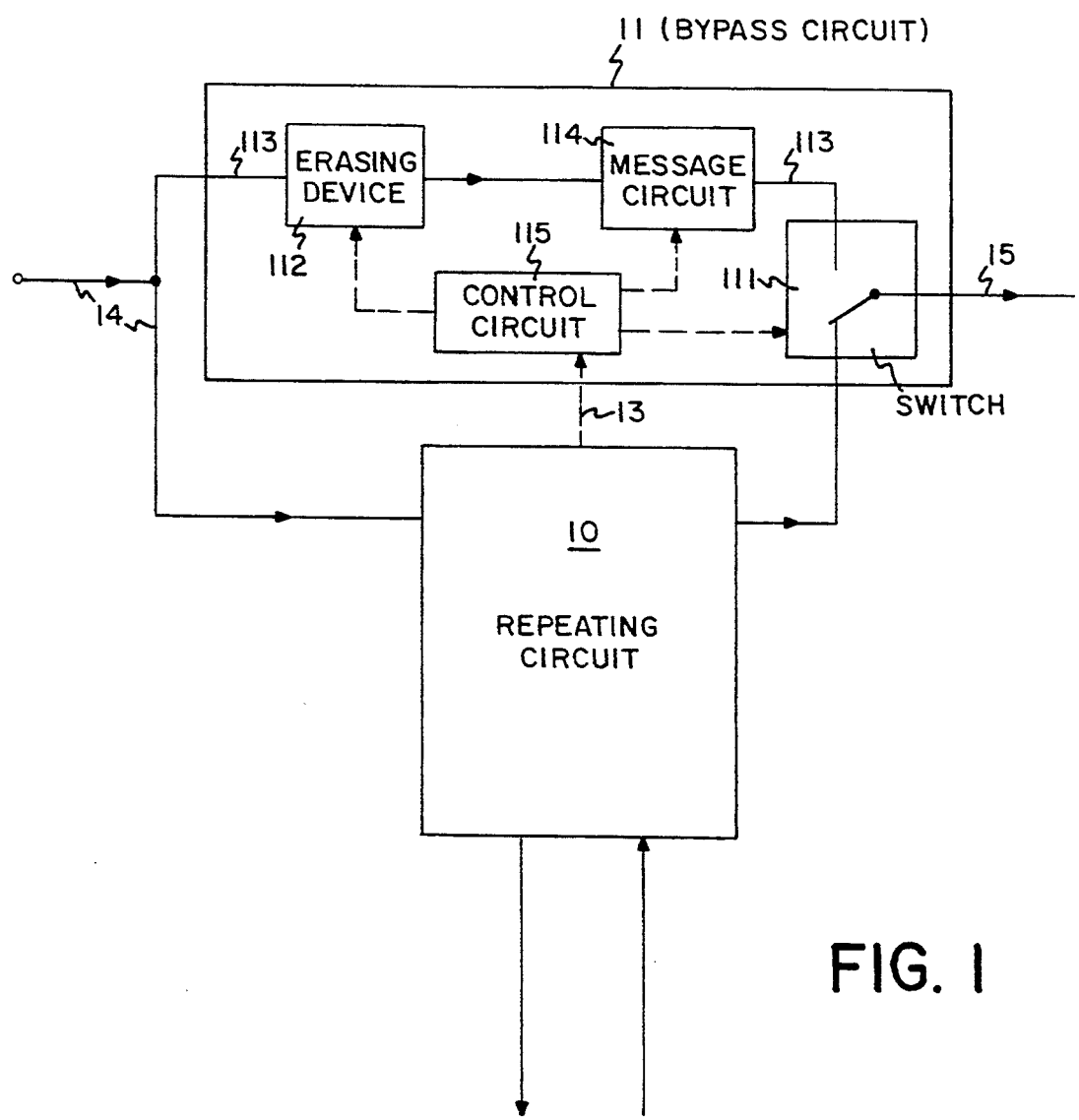
FIG. 1 shows a block diagram of the repeater with a bypass circuit.

A repeating circuit 10 shown in FIG. 1 serves to branch and re-inject time slots of a time-division multiplex signal which is fed to the repeater via an input line 14 and transmitted to an adjacent repeater via an output line 15. The repeater contains a bypass circuit 11 comprising a bypass 113, an erasing device 112, a message circuit 114 for transmitting a message, a switch 111 and a control circuit 115 which controls the erasing device 112, the circuit 114 and the switch 111.

The control circuit is controlled by the repeater via a control line 13.

If an alarm is triggered in the repeater, the time-division multiplex signal is passed on to the output line 15 via the bypass circuit 11.

Such an alarm can occur, for example, if the level of supply voltage drops to a value at which the repeater no longer performs its functions flawlessly. The repeater then signals the control circuit 115 via the control line 13, which thereupon closes the switch 111 so that the time-division multiplex signal is led past the repeater via the bypass 113.

The time-division multiplex signal is fed within the bypass 113 to the erasing device 112.

In another embodiment of a repeater according to the present invention, but not illustrated here, in which the time slots are only to be branched, these time slots are erased in the erasing device 112 if an alarm condition exists in this repeater so as to prevent their content from being fed by another repeater in the transmission direction or by the line terminal equipment to another receiver.

The repeater described is used both for branching time slots and also for the re-injection of branched time slots. A re-injection circuit 10a, not illustrated, is used for the re-injection.

If an alarm is triggered, the erasing device 112 erases the content of the time slots to be branched and the circuit 114, in the time slots to be re-injected, passes on a message to one or a plurality of adjacent repeaters. On account of the message, the time slots not re-injected in the repeater are re-injected in the adjacent repeater or the adjacent repeaters.

If the time-division multiplex signal contains a service channel, then both in a repeater with only branching as well as in the repeater illustrated in FIG. 1 with branching and re-injection of time slots, the circuit 114 transmits messages in the service channel to one or a plurality of adjacent repeaters and/or to the line terminal equipment.

In the repeater illustrated in FIG. 1, the circuit 114 transmits a message to one or a plurality of adjacent repeaters so that the time slots not re-injected in the repeater are re-injected in the adjacent repeater or the adjacent repeaters.

In another variant, as long as no alarm is triggered, the repeater transmits a message characteristic of the repeater at specific points in the pulse frame of the multiplex signal so that if this message fails to appear in one or a plurality of adjacent repeaters, follow-up measures are initiated.

Figure 2:
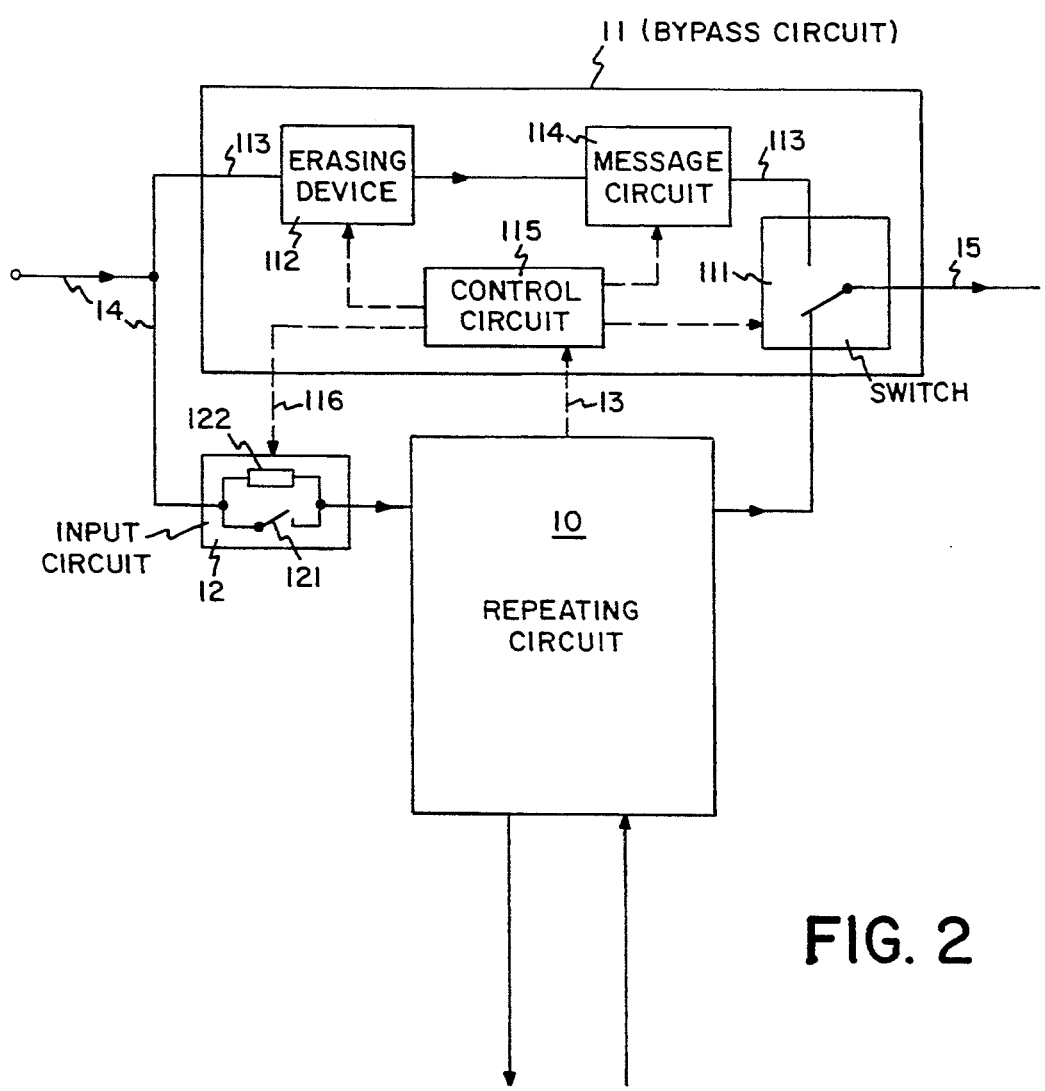
FIG. 2 shows a block diagram of a repeater with a bypass circuit according to FIG. 1 and an input circuit.
Figure 3:
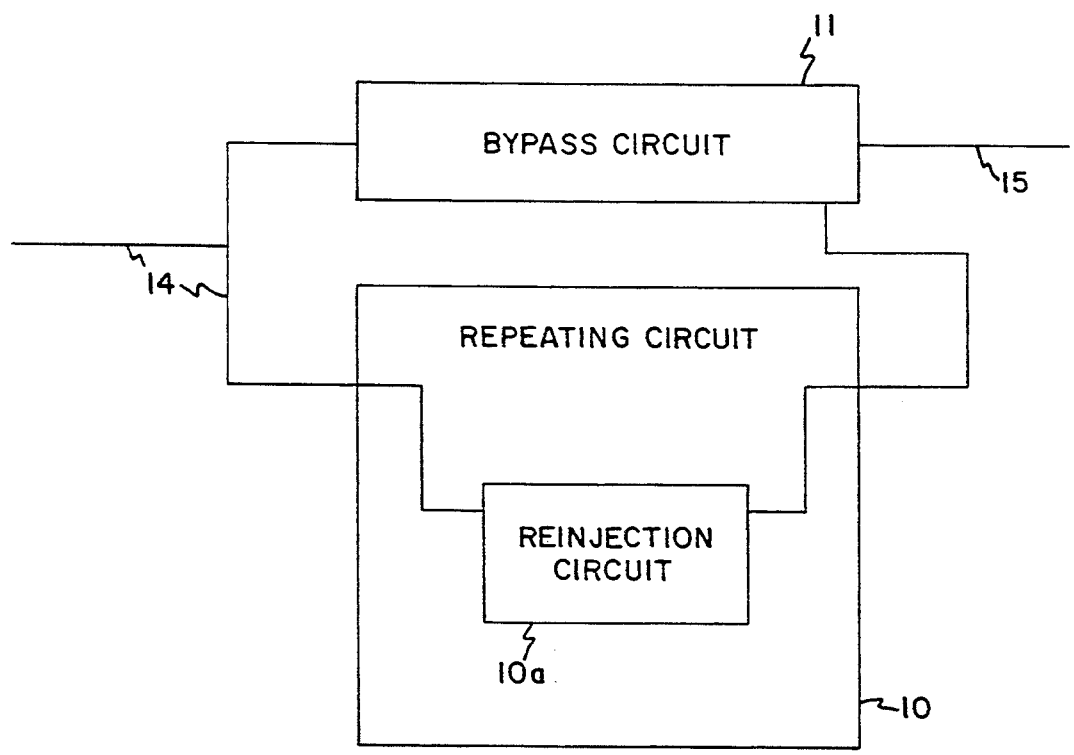
FIG. 3 shows a repeater having a repeating circuit with a re-injection circuit.

Another repeating circuit shown in FIG. 2 comprises an input circuit 12 contained in the input line 14. The input circuit 12 is controlled by the control circuit 115 via a control line 116. The input circuit 12 contains a high-value resistor 122 and a switch 121. If the switch 121 is closed, the resistor 122 is bypassed.

If an alarm is triggered in the repeater, the control circuit 115, via the control line 116, causes the switch 121 to open. The time-division multiplex signal is then fed with a low signal level to the repeater via the resistor 122. In this way, the level of the time-division multiplex signal to be transmitted is only slightly lower; receipt in the adjacent repeaters and in the line terminal equipment is not noticeably impaired.

When the alarm in the repeater ends, for example when the supply voltage has again reached the normal value, then the repeater, via the control line 13, can again shut down the bypass 113 by means of the control circuit 115, in that it opens the switch 111.

The control circuit 115 of the bypass circuit 11 then causes the switch 121 to close via the control line 116.

It is also possible to control the input circuit 12 directly from the repeater.

Instead of the switch 121 and the resistor 122, an electronic network with logic gates or with a relay can also be used.

Such a relay is then controlled directly via the control line 13 and automatically changes the position of the switch 111 if an alarm is triggered. In this case, the control circuit 115 is unnecessary.

What is claimed is:

1. A repeater in a transmission link for transmitting digital signals using time-division multiplexing, comprising:
   a repeating circuit having an input and an output and being connected in the transmission link for branching out time slots to said output from an incoming time-division multiplex digital signal received at said input;
   a bypass circuit connecting said input to said output so that the incoming time-division multiplex digital signal is passed from said input to said output onward along the transmission link if an alarm is triggered in the repeating circuit;
   wherein said repeating circuit includes a re-injection circuit, in which the time slots to be branched are re-injected into the transmission link; and
   wherein the bypass circuit includes a control circuit and a circuit for transmitting a message, so that if an alarm is triggered in the repeating circuit, the control circuit causes the circuit to transmit in a time slot that is not re-injected a message in the transmission direction to one or a plurality of adjacent repeaters, on the basis of which the time slots not re-injected in the repeater can be re-injected in the adjacent repeater or adjacent repeaters.

2. A repeater in a transmission link for transmitting digital signals using time-division multiplexing, comprising:
   a repeating circuit having an input and an output and being connected in the transmission link for branching out time slots to said output from an incoming time-division multiplex digital signal received at said input;
   a bypass circuit connecting said input to said output so that the incoming time-division multiplex digital signal is passed from said input to said output onward along the transmission link if an alarm is triggered in the repeating circuit;
   wherein the bypass circuit includes a control circuit and a circuit for transmitting a message, so that the control circuit causes the circuit to transmit a message in a service channel of the time-division multiplex signal to one or a plurality of adjacent repeaters and/or to a line terminal equipment.

3. A repeater in a transmission link for transmitting digital signals using time-division multiplexing, comprising:
   a repeating circuit having an input and an output and being connected in the transmission link for branching out time slots to said output from an incoming time-division multiplex digital signal received at said input;
   a bypass circuit connecting said input to said output so that the incoming time-division multiplex digital signal is passed from said input to said output onward along the transmission link if an alarm is triggered in the repeating circuit;
   wherein said repeating circuit includes a re-injection circuit, in which the time slots to be branched are re-injected into the transmission link; and
   wherein the bypass circuit includes a control circuit and a circuit for transmitting a message, so that the control circuit causes the circuit to transmit a message in a service channel of the time-division multiplex signal to one or a plurality of adjacent repeaters in the transmission direction, on the basis of which the time slots not re-injected in the repeater can be re-injected in the adjacent repeater or adjacent repeaters.

4. A repeater in a transmission link for transmitting digital signals using time, division multiplexing, said repeater comprising:
   a repeating circuit having an input and an output and being connected in the transmission link for branching out time slots to said output from an incoming time-division multiplex digital signal received at said input; and
   a bypass circuit connecting said input to said output so that the incoming time-division multiplex digital signal is passed from said input to said output onward along the transmission link if an alarm is triggered, in the repeating circuit,
   wherein the repeating circuit is preceded by an input circuit which, if an alarm is triggered in the repeating circuit, causes the time-division multiplex signal to be fed to the repeating circuit via a high-value resistor, and the bypass circuit includes a control circuit connected to the repeating circuit for receiving the alarm therefrom, a bypass line having first and second ends, the first end connected to the repeating circuit input, a switch controlled by the control circuit and connected to the repeating circuit output and the second end of the bypass line for selectively connecting one of the repeating circuit output and the bypass line to the transmission link, whereby the repeating circuit causes the control circuit, via an alarm line, to close the switch and connect the bypass line to the transmission link and to re-open the switch when an alarm ends, so that the time-division multiplex signal is no longer transmitted via the bypass line.

5. A repeater in a transmission link for transmitting digital signals using time-division multiplexing, said repeater comprising:

a repeating circuit (10) having a repeating circuit input (14) and a repeating circuit output (15) and being connected in the transmission link for branching out time slots from an incoming time-division multiplex signal; and a bypass circuit (11) connecting said repeating circuit input (14) to said repeating circuit output (15) so that the digital signals are passed onward along the transmission link if an alarm is triggered in the repeating circuit, wherein the bypass circuit (11) includes:

a control circuit (115) connected to the repeating circuit (10) for receiving the alarm therefrom;

a bypass line (113) having first and second ends, the first end connected to the repeating circuit input (14);

a switch (111) controlled by the control circuit (115) and connected to the repeating circuit output (15) and the second end of the bypass line (113) for selectively connecting the repeating circuit output (15) to the bypass line (113); and an erasing device (112) controlled by the control circuit (115) and disposed in the bypass line, whereby the control circuit (115) places the switch (111) in such a position that the time-division multiplex signal is transmitted via the bypass line (113), and activates the erasing device (112) so that the data contents of time slots to be branched out are erased therein when an alarm is triggered.

* * * * *

UNITED STATES PATENT AND TRADEMARK OFFICE
CERTIFICATE OF CORRECTION

PATENT NO. : 5,386,416
DATED : January 31, 1995
INVENTOR(S) : A. Neth

It is certified that error appears in the above-indentified patent and that said Letters Patent is hereby corrected as shown below:

At column 4, line 52 (claim 4, line 2), please change "time, division" to --time-division--; and at line 63 (claim 4, line 13), please delete the comma after "triggered".

Signed and Sealed this

Fourth Day of July, 1995

Attest:

BRUCE LEHMAN

Attesting Officer     Commissioner of Patents and Trademarks